United States Patent [19]

Halasz et al.

[11] Patent Number: 4,878,950

[45] Date of Patent: Nov. 7, 1989

[54] BITUMEN COMPOSITION

[75] Inventors: Andrew Halasz, Dollard des Ormeaux; Giuseppe Spinelli, Baie d'Urfe, both of Canada; David H. Doolittle, Houston, Tex.

[73] Assignee: Exxon Chemical Patents Inc., Linden, N.J.

[21] Appl. No.: 187,700

[22] Filed: Apr. 29, 1988

[51] Int. Cl.$^4$ .............................................. C08L 95/00
[52] U.S. Cl. .................................. 106/273.1; 106/285; 524/71
[58] Field of Search ................ 106/273 R, 285, 273.1; 524/71

[56] References Cited

U.S. PATENT DOCUMENTS

| | | | |
|---|---|---|---|
| 3,070,568 | 12/1962 | Gessler et al. | 525/499 |
| 3,336,252 | 8/1967 | Raichle et al. | 524/70 |
| 3,615,803 | 10/1971 | Draper | 106/280 |
| 3,703,393 | 11/1972 | Koons | 106/285 |
| 3,915,914 | 10/1975 | Binder | 260/28.5 |
| 3,992,340 | 11/1976 | Bonitz | 524/71 |
| 4,032,491 | 6/1977 | Schoenke | 260/28.5 |
| 4,154,710 | 5/1979 | Maldonado et al. | 524/71 |
| 4,418,167 | 11/1983 | Böhm et al. | 524/72 |
| 4,585,816 | 4/1986 | Vitkuske | 524/68 |

FOREIGN PATENT DOCUMENTS 58-47057 3/1983 Japan .

Primary Examiner—Paul Lieberman
Assistant Examiner—Helene Kirschner
Attorney, Agent, or Firm—C. E. Smith; E. T. Wheelock

[57] ABSTRACT

A bitumen composition comprising asphalt and a low molecular weight α-olefin homopolymer or copolymer. The composition is useful in the preparation of roofing coatings or materials and the cured roofing material will exhibit improved low temperature flexibility when compared to prior art roofing compositions. The composition may also contain other additives including high molecular weight polymers, fillers, fire retardants, antioxidants, anti-ozonants, pigments and the like.

13 Claims, No Drawings

BITUMEN COMPOSITION

BACKGROUND OF THE INVENTION

This invention relates to a bitumen composition. More particularly, this invention relates to a composition comprising bitumen and a low molecular weight olefin polymer.

Bitumen compositions, particularly asphalt compositions, comprising one or more polymeric modifiers are, of course, well known in the prior art. In general, the addition of a polymeric modifier to a bitumen composition, particularly an asphalt composition, will improve one or more of the bitumen properties such as penetrations, softening point, toughness, tenacity, heat resistance and the like such as taught in Japanese Pat. No. Sho 58[1983]-47057. Suitable polymeric additives include: block copolymers of an alkenyl aromatic monomer and a conjugated diolefin such as taught in U.S. Pat. No. 4,585,816 and the patents therein cited; olefin homopolymers and copolymers, particularly 1-butene homopolymers and copolymers, as taught in U.S. Pat. No. 3,915,914 and the patents therein cited; and isolefin homopolymers, particularly polyisobutylene, as taught in U.S. Pat. No. 3,615,803.

It is also known in the prior art to use asphalt compositions containing polymeric modifiers in the preparation of roofing materials and coatings such as is taught in U.S. Pat. No. 4,032,491 and the patents therein cited. While such roofing materials have exhibited improved properties, particularly improved penetration and heat resistant properties, these roofing materials have not demonstrated good low temperature properties, particularly low temperature flexibility, when used in extremely cold regions of the world. As a result, asphalt roofing materials, particularly asphalt shingles, are, generally, not used as roofing materials in extremely cold regions of the world or when used must be frequently replaced as the result of cracking and shrinking failures when subjected to extremely low temperatures for extended periods of time. Since asphalt roofing materials, particularly shingles, offer several advantages when such roofing materials can be used without frequent failure, the need for an improved asphalt roofing material which can be used in extremely cold regions of the world is believed readily apparent. In addition, it would be advantageous if such materials could be manufactured so as to facilitate handling when utilized in the regions which have cold temperatures.

SUMMARY OF THE INVENTION

It has now been discovered that the foregoing and other disadvantages of the prior art bitumen compositions can be avoided or at least significantly reduced with the bitumen composition of the present invention and an improved bitumen roofing material which can be used with reduced incidences of failure in extremely cold regions produced therewith. It is, therefore, an object of this invention to provide a bitumen composition useful in the preparation of roofing materials having improved low temperature properties. It is another object of this invention to provide a roofing material having improved low temperature properties. It is still another object of this invention to provide such a roofing material having improved low temperature flexibility. It is yet another object of this invention to provide such a roofing material having reduced shrinkage characteristics at low temperature. The foregoing and other objects and advantages will become apparent from the description of the invention set forth hereinafter.

In accordance with the present invention, the foregoing and other objects and advantages are accomplished with a bitumen composition comprising an asphalt and a low molecular weight olefin homopolymer or copolymer. The bitumen composition may be used as a coating or preformed into a suitable roofing material such as a shingle.

DETAILED DESCRIPTION OF THE INVENTION

As indicated supra, the present invention is drawn to a bitumen composition comprising asphalt and a low molecular weight olefin homopolymer or copolymer which bitumen composition is useful in the preparation of roofing compositions and structures. As indicated more fully hereinafter, the bitumen composition may comprise other materials such as fillers, pigments, other synthetic or natural resins, stabilizers, fire retardants and the like.

In general, any of the natural and synthetic asphalts are suitable for use in the composition of the present invention. Suitable asphalts, then, include native, rock, and lake asphalts as well as petroleum asphalts. The suitable asphalts may be neat, highly cracked, residual or air blown. In general, asphalts useful in the composition of the present invention will have penetrations within the range from about 5 to about 350 (ASTM Method D5), softening points within the range from about 30° C. to about 130° C. and breaking points within the range from about 20° C. to about −5° C. Heavily oxidized asphalts; i.e., asphalts containing from about 10 wt.% to about 50 wt.% asphaltenes are particularly useful in the compositions of the present invention and are, therefore, preferred.

In general, any olefin polymer or copolymer having a molecular weight within the range from about 750 to about 5000 preferably from about 700 to 2500 as determined by the AM-S 320.06 method, having sufficient branching to impart the desired improvement in low temperature flexibility may be used in the compositions of the present invention. Suitable polymers, then, include homopolymers and copolymers of α-olefins having from 3 to about 10 carbon atoms wherein at least about 80% of the monomeric addition is 1,2. Copolymers of linear α-olefins having from 4 to about 10 carbon atoms and α-isolefins having from 4 to about 10 carbon atoms are particularly effective in the compositions of the present invention and are, therefore, preferred. In a preferred composition of this invention, an olefin copolymer comprising from about 10 wt.% to about 95 wt.% of an α-isolefins such as isobutylene and from about 20 to about 80% of a linear α-olefin such as butene-1, where the number of carbon atoms in these olefins will vary from about 4 to 8 carbon atoms. It is anticipated that some internal olefins such as butene-2 can also be present at a level of from 2 to about 30 wt.%. In a most preferred embodiment of the present invention, a copolymer comprising from about 0 wt.% to about 30 wt.% of 1-butene and from about 100 wt.% to about 70 wt.% of isobutylene will be used. In the most preferred embodiment, the copolymer will be normally liquid and have a molecular weight within the range from about 700 to about 2200, as determined by the AMS-S 320.06 test method. In general, the olefin polymer or copolymer will be incorporated into the formulation at a concentration within the range from about 1–10 wt.%, based on asphalt. In a preferred embodiment, the olefin-isolefin copolymer will be incorporated into the composition at a concentration within the range from about 3 to about 7 wt.%, based on asphalt.

Polymers useful in the composition of the present invention are, of course, well known in the prior art and many are available commercially. A particularly preferred copolymer useful in the compositions of the present invention is available commercially from Exxon Chemical Company under the name Parapol. Parapol is a liquid copolymer of isobutylene and 1-butene and is available in several different molecular weights ranging from about 700 to about 2500. In general, low molecular weight polymers useful in the composition of the present invention may be prepared in bulk, suspension, solution and emulsion processes. As is well known, polymerization of suitable monomers to produce a low molecular weight polymer may be accomplished with free radical, cationic and anionic initiators or polymerization catalysts. In general, polymerization will be accomplished at a temperature within the range from about −20° C. to about 50° C. at a pressure within the range from about 2 psig to about 200 psig.

In general, the low molecular weight olefin homopolymer or copolymer can be combined with the asphalt using any of the methods known heretofore in the prior art for combining such materials. Suitable methods include, then, simple admixture at ambient conditions, admixture in the molten state with agitation and admixtures of solutions of both components. As is known in the prior art, when the components are admixed at ambient conditions, it will be advantageous to finely divide the asphalt and the olefin polymer should it also be solid at ambient conditions. As is also well known in the prior art, molten phase admixture can be accomplished by heating both components to a temperature above the respective melting points. To the extent a liquid polymer is used, however, liquid phase admixture can be accomplished simply by heating the asphalt to the molten state. As further known in the prior art, solution admixture may be accomplished by dissolving the two components in a suitable solvent, which solvent may be the same or different, and thereafter evaporating the solvent. As indicated more fully hereinafter, however, when the composition of this invention is to be used as a coating composition, it will, generally, be used in solution. In such case, the solution mixing will be accomplished in the solvent or solvent mixture contemplated for use in the composition and evaporation thereof will not be necessary.

As indicated supra, the composition of this invention may also comprise other additives including high molecular weight polymers which may be added for any of the reasons known therefor in the prior art including improvement of adhesive properties, penetration, softening point, toughness, tenacity, heat resistance and the like. While the order of addition of such additives is not critical to the preparation of a suitable composition, and to the extent that different methods might be required to accomplish such addition, it is nonetheless desirable to first prepare what might be termed a base composition within the scope of the present invention; vis., a mixture of asphalt and low molecular weight olefin polymer. Suitable methods for incorporating additional additives are disclosed, for example in U.S. Pat. No. 4,032,491, the disclosure of which patent is hereby incorporated by reference.

As is well known, roofing compositions generally contain significant amounts of fillers and such fillers may be used in the compositions of the present invention. Suitable fillers include asbestos (both as short and long fibers), magnesium silicate, calcium carbonate, micronized silicas, berium sulfate and hydrated clays. The advantages associated with each of these fillers is, of course, well known in the prior art. For example, each will reduce the amount of asphalt required to produce a roofing layer of any given thickness. Moreover, most, if not all, of these fillers will improve fire resistance and some actually improve strength, hardness and other properties. Calcium carbonate is a particularly preferred filler for use in the composition of the present invention since, as limestone, it is relatively inexpensive and offers minimal change in properties of the finished roofing structure sought in the present invention, particularly low temperature flexibility. In general, fillers will be incorporated into the compositions of this invention at concentrations within the range from about 20 to about 75 parts per part of combined asphalt and low molecular α-olefin polymer. Preferably, the filler will be incorporated at a concentration within the range from about 50 to about 70 parts per part of combined asphalt and α-olefin polymer.

Compositions of the present invention may also comprise other additives such as anti-oxidants and/or anti-ozonants. The roofing compositions of this invention may also comprise other ultraviolet-light stabilizers, particularly when carbon black is not used as a pigment or for this purpose. Use of these additives is, of course, optional and will depend upon the environment to which the roof will be exposed. When used, these additives will be incorporated at concentrations well known in the prior art.

PREFERRED EMBODIMENT

In a preferred embodiment of the present invention, a heavily oxidized asphalt having a penetration within the range from about 20 to about 50 and containing from about 10 wt.% to about 30 wt.% asphaltenes will be used. The preferred base composition will comprise from about 3 wt.% to about 7 wt.% of a liquid isobutylene-butene copolymer having a molecular weight within the range from about 700 to 2200 and containing from about 100 wt.% to about 70 wt.% isobutylene monomer units and from about 0 wt.% to about 30 wt.% butene monomer units. The base composition will be prepared by mixing the polymer and asphalt at a temperature within the range from about 150° C. to about 180° C. with mild agitation for a period of time within the range from about 1 minute to about 10 minutes. A preferred composition within the scope of the present invention will also comprise from about 50 to about 70 parts of calcium carbonate (limestone) per combined part of asphalt and α-olefin polymer. The calcium carbonate will be incorporated into the composition after the base composition has been prepared by mixing the base composition and the calcium carbonate at a temperature within the range from about 150° C. to about 180° C. with mild agitation for a period of time within the range from about 10 minutes to about 50 minutes. The composition will then be used in the preparation of glass mat reinforced asphalt shingles by applying a coating of the composition to both sides of the glass base using coating or similar techniques.

Having thus broadly described the present invention and a preferred and most preferred embodiment thereof, it is believed that the same will become even more apparent by reference to the following examples. It will be appreciated, however, that the examples are presented solely for purposes of illustration and should not be construed as limiting the invention.

EXAMPLE 1

In this example, two compositions within the scope of the present invention and one composition prepared in accordance with prior art techniques using a commercially available formulation were prepared and then used in the preparation of glass based asphalt shingles. The latter of these compositions was prepared for comparative purposes. The first of the compositions within the scope of this invention contained 44.5 wt.% of a 15/20 pen oxidized asphalt and 55.5 wt.% limestone and 5 wt.%, based on oxidized asphalt, of an isobutylene-1-butene copolymer having a molecular weight of 950 and containing 85-95 wt.% isobutylene and 5-15 wt.% 1-butene monomer units. The second of the compositions within the scope of the present invention comprised 44.5 wt.% of the same 15/20 pen oxidized asphalt, 55.5 wt.% limestone and 5 wt.%, based on oxidized asphalt, of an isobutylene-1-butene copolymer having a molecular weight of 2200 and containing 85-95 wt.% isobutylene monomeric units and 5-15 wt.% 1-butene monomeric units. The third composition, prepared for comparative purposes, contained 44.5 wt.% of the same 15/20 pen oxidized asphalt and 55.5 wt.% limestone. The third formulation, then, did not contain any low molecular weight α-olefin polymer. For convenience, these compositions are hereinafter referred to as compositions A, B and C. The compositions within the scope of the present invention were prepared by first blending the oxidized asphalt and the limestone at a temperature of 150° C. in a laboratory mixer and then the low molecular weight α-olefin. The third composition was prepared simply by blending the oxidized asphalt and limestone at a temperature of 150° C. in a laboratory mixer. Each composition was then used to prepare glass based asphalt shingles by laminating a layer of the composition on both sides of the glass base. In the shingles, the layer of asphalt composition on both sides of the glass base was about 1.0 mm and the total glass based shingle thickness was approximately 3.0 mm. The softening point in °C. and penetration of each formulation was determined at 20° C. and 50° C. as was the viscosity of each formulation at 190° C. and 200° C. The low temperature flexibility of the shingles was then determined at 0° C., −5° C. and −7° C. using a test procedure wherein the shingle was wrapped around a cylinder having a 25 mm diameter and held for 5 seconds. If the shingle cracked, the shingle failed the low temperature flex at the temperature at which it was tested. The results obtained with each of the three compositions are summarized in the following table:

|  | COMPOSITION | | |
| --- | --- | --- | --- |
|  | A | B | C |
| SP °C. | 110 | 102 | 103 |
| PEN at 20° C. | 15 | 15 | 14 |
| PEN at 50° C. | 42 | 48 | 43 |
| VISC at 190° C. (CPS) | 3170 | 1414 | 1688 |
| VISC at 200° C. (CPS) | 1215 | 900 | 1074 |
| LTFLEX 0° C. | PASS | PASS | FAIL |
| LTFLEX −5° C. | PASS | PASS | FAIL |
| LTFLEX −7° C. | FAIL | FAIL | FAIL |

From the foregoing, it will be apparent that incorporation of 5 wt.% of a low molecular weight isobutylene-butene copolymer significantly improves the low temperature flexibility of the more conventional asphalt shingle composition. In this regard, it should be noted that the shingle prepared with coating C failed at all three temperatures (0° C., −5° C. and −7° C.) while the shingles prepared with the compositions within the scope of the present invention passed the flexibility test as 0° C. and −5° C.

As will be apparent from the foregoing, larger amounts of asphalt can be used in the composition without adversely impacting on the shingle's ability to pass the low temperature flexibility test at least at the two higher temperatures.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

Having thus described and illustrated the present invention, what is claimed is:

1. A bitumen composition comprising asphalt and from about 1 wt.% to about 10 wt.%, based on asphalt, of an α-olefin polymer having a molecular weight within the range from about 750 to about 5000.

2. The composition of claim 1 wherein said α-olefin polymer is a homopolymer of an α-olefin having from 3 to 10 carbon atoms.

3. The composition of claim 1 wherein said α-olefin polymer is a copolymer of a linear α-olefin having from 4 to 10 carbon atoms and an isolefin having from 4 to 10 carbon atoms.

4. The composition of claim 3 wherein said copolymer is a copolymer of 1-butene and isobutylene.

5. The composition of claim 4 wherein said copolymer comprises from about 10 wt.% to about 95 wt.% isobutylene and from about 20 wt.% to about 80 wt.% of 1-butene and 2 wt.% to 30 wt.% of 2-butene.

6. The composition of claim 5 wherein the molecular weight of said copolymer is within the range from about 700 to about 2200.

7. A bitumen composition comprising asphalt and from about 1 wt.% to about 15 wt.%, based on asphalt, of an α-olefin polymer having a molecular weight within the range from about 700 to about 2200.

8. The composition of claim 7 wherein said α-olefin polymer is a homopolymer of an α-olefin having from 4 to 10 carbon atoms.

9. The composition of claim 7 wherein said α-olefin polymer is a copolymer of a linear α-olefin having from 4 to 10 carbon atoms and an isolefin having from 4 to 10 carbon atoms.

10. The composition of claim 9 wherein said copolymer is a copolymer of 1-butene and isobutylene and 2-butene.

11. The composition of claim 10 wherein said copolymer comprises from about 10 wt.% to about 95 wt.% isobutylene and from about 20 wt.% to about 80 wt.% of 1-butene and 2 wt.% to 30 wt.% 2-butene.

12. The composition of claim 11 wherein the molecular weight of said copolymer is within the range from about 700 to about 2200.

13. A roofing shingle comprising the composition of claim 7.

* * * * *